(12) United States Patent
Gordon

(10) Patent No.: US 11,608,117 B2
(45) Date of Patent: Mar. 21, 2023

(54) REAR STRUT GUSSET PLATES FOR REINFORCING AN OFF-ROAD CHASSIS

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 197 days.

(21) Appl. No.: 17/196,264

(22) Filed: Mar. 9, 2021

(65) Prior Publication Data

US 2021/0276623 A1 Sep. 9, 2021

Related U.S. Application Data

(60) Provisional application No. 62/987,283, filed on Mar. 9, 2020.

(51) Int. Cl.
| | |
|---|---|
| *B62D 25/08* | (2006.01) |
| *B62D 27/02* | (2006.01) |
| *B62D 25/20* | (2006.01) |

(52) U.S. Cl.
CPC .......... *B62D 25/088* (2013.01); *B62D 25/20* (2013.01); *B62D 27/02* (2013.01)

(58) Field of Classification Search
CPC ...... B62D 25/088; B62D 25/20; B62D 27/02; B62D 23/005
See application file for complete search history.

(56) References Cited

U.S. PATENT DOCUMENTS

| | | | | |
|---|---|---|---|---|
| 5,344,187 | A | * | 9/1994 | Kreis ................... B62D 23/005 296/203.02 |
| 5,580,121 | A | * | 12/1996 | Dange .................. B62D 25/088 296/29 |
| 2019/0300064 | A1 | * | 10/2019 | Hisamura ............ B62D 23/005 |
| 2019/0375463 | A1 | * | 12/2019 | Upah .................... B62D 25/084 |
| 2021/0155189 | A1 | * | 5/2021 | Gordon .................. B60R 21/13 |

FOREIGN PATENT DOCUMENTS

JP 2017137003 A * 8/2017 ............. B60G 11/15

* cited by examiner

*Primary Examiner* — Lori L Lyjak
(74) *Attorney, Agent, or Firm* — Rutan & Tucker LLP; Hani Z. Sayed

(57) ABSTRACT

An apparatus and methods are provided for a chassis for an off-road vehicle that includes a chassis strut support. The chassis is a welded-tube variety of chassis that includes a front portion and a rear portion that are joined to an intervening passenger cabin portion. The chassis strut support includes one or more pairs of rear strut gusset plates for distributing loading on a rear strut crossmember by rear struts to at least a seat crossmember comprising the chassis. The rear strut gusset plates generally comprise thick sheet-members configured to be attached to a vertical brace between an upper mount and a lower stay comprising the chassis to reinforce the vertical brace and impart increased strength to the chassis. The rear strut gusset plates are configured to be attached to the vertical brace by way of bolts, rivets, welding, or any combination thereof.

19 Claims, 4 Drawing Sheets

REAR STRUT GUSSET PLATES FOR REINFORCING AN OFF-ROAD CHASSIS

PRIORITY

This application claims the benefit of and priority to U.S. Provisional Application, entitled "Rear Strut Gusset Plates For Reinforcing An Off-Road Chassis," filed on Mar. 9, 2020 and having application Ser. No. 62/987,283, the entirety of said application being incorporated herein by reference.

FIELD

Embodiments of the present disclosure generally relate to the field of vehicle chassis systems. More specifically, embodiments of the disclosure relate to an apparatus and methods for an off-road vehicle chassis comprising rear strut gusset plates configured to improve the strength of the chassis.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a chassis for an off-road vehicle that includes a chassis strut support. The chassis comprises a welded-tube variety of chassis that includes a front portion and a rear portion that are joined to an intervening passenger cabin portion. The chassis strut support includes one or more pairs of rear strut gusset plates for distributing loading on a rear strut crossmember by rear struts to at least a seat crossmember comprising the chassis. The rear strut gusset plates generally comprise thick sheet-members configured to be attached to a vertical brace between an upper mount and a lower stay comprising the chassis to reinforce the vertical brace and impart increased strength to the chassis. The rear strut gusset plates are configured to be attached to the vertical brace by way of any of bolts, rivets, welding, or any combination thereof.

In an exemplary embodiment, a chassis strut support for a chassis of an off-road vehicle comprises: a first pair of rear strut gusset plates disposed on opposite sides of a first vertical brace for distributing loading on a rear strut crossmember by a first rear strut to at least a seat crossmember; and a second pair of rear strut gusset plates disposed on opposite sides of a second vertical brace for distributing loading on the rear strut crossmember by a second rear strut to at least the seat crossmember.

In another exemplary embodiment, the first rear strut and the second rear strut are operably coupled between the rear strut crossmember of the chassis and a trailing arm suspension system that is coupled with rear wheels of the off-road vehicle. In another exemplary embodiment, the rear strut is joined with the trailing arm suspension system by way of a lower mount. In another exemplary embodiment, the rear strut is fastened to the rear strut crossmember by way of an upper mount that is fixated to the rear strut crossmember and thus provides a means for coupling the rear strut to the chassis. In another exemplary embodiment, the upper mount distributes loading of the rear strut onto the rear strut crossmember during articulation of the trailing arm suspension system due to terrain.

In another exemplary embodiment, each of the first vertical brace and the second vertical brace is disposed between the rear strut crossmember and the seat crossmember are is configured to distribute loading on the rear strut crossmember to the seat crossmember. In another exemplary embodiment, each of the first pair of rear strut gusset plates and the second pair of rear strut gusset plates is configured to be coupled with a vertical brace to provide increased structural integrity to the rear strut crossmember, the vertical brace, and the seat crossmember. In another exemplary embodiment, each of the first pair of rear strut gusset plates and the second pair of rear strut gusset plates comprises thick sheet-members that are configured to be attached to the vertical brace between an upper mount and a lower stay comprising the chassis.

In another exemplary embodiment, the first pair of rear strut gusset plates and the second pair of rear strut gusset plates are configured to reinforce the vertical brace and impart increased strength to the chassis. In another exemplary embodiment, one or more of the first pair of rear strut gusset plates and the second pair of rear strut gusset plates are configured to be attached to any one or more of the upper mount, the rear strut crossmember, the vertical brace, the seat crossmember, and the lower stay by way of bolts, rivets, welding, or any combination thereof. In another exemplary embodiment, one or more of the first pair of rear strut gusset plates and the second pair of rear strut gusset plates comprise portions of a single component that is configured to fit over the vertical brace. In another exemplary embodiment, the single component is configured to be fastened onto any one or more of the rear strut crossmember, the vertical brace, the seat crossmember, and a lower stay.

In an exemplary embodiment, a method for a chassis strut support for a chassis of an off-road vehicle comprises: attaching a first pair of rear strut gusset plates on opposite sides of a first vertical brace for distributing loading on a rear strut crossmember by a first rear strut to at least a seat crossmember; and attaching a second pair of rear strut gusset plates on opposite sides of a second vertical brace for distributing loading on the rear strut crossmember by a second rear strut to at least the seat crossmember.

In another exemplary embodiment, attaching includes configuring the first vertical brace and the second vertical brace to distribute loading on the rear strut crossmember to at least the seat crossmember. In another exemplary embodiment, attaching includes configuring thick sheet-members to be attached to the vertical brace between an upper mount and a lower stay comprising the chassis. In another exemplary embodiment, configuring includes configured the thick sheet-members to be attached to any one or more of the upper mount, the rear strut crossmember, the vertical brace, the seat crossmember, and the lower stay by way of bolts, rivets, welding, or any combination thereof.

In an exemplary embodiment, a method of reinforcing a chassis strut support of a chassis of an off-road vehicle comprises: aligning a first rear strut gusset plate along a first side of a vertical brace of the chassis; aligning a second rear strut gusset plate along a second side of the vertical brace; fastening the first rear strut gusset plate to the first side; and fastening the second rear strut gusset plate to the second side.

In another exemplary embodiment, fastening the first rear strut gusset plate includes fixating the first rear strut gusset plate to any one or more of an upper mount, a rear strut crossmember, the vertical brace, a seat crossmember, and a lower stay by way of bolts, rivets, welding, or any combination thereof. In another exemplary embodiment, fastening the second rear strut gusset plate includes using any of bolts, rivets, welding, or any combination thereof, to fixate the second rear strut gusset plate to any one or more of an upper mount, a rear strut crossmember, the vertical brace, a seat crossmember, and a lower stay comprising the chassis.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
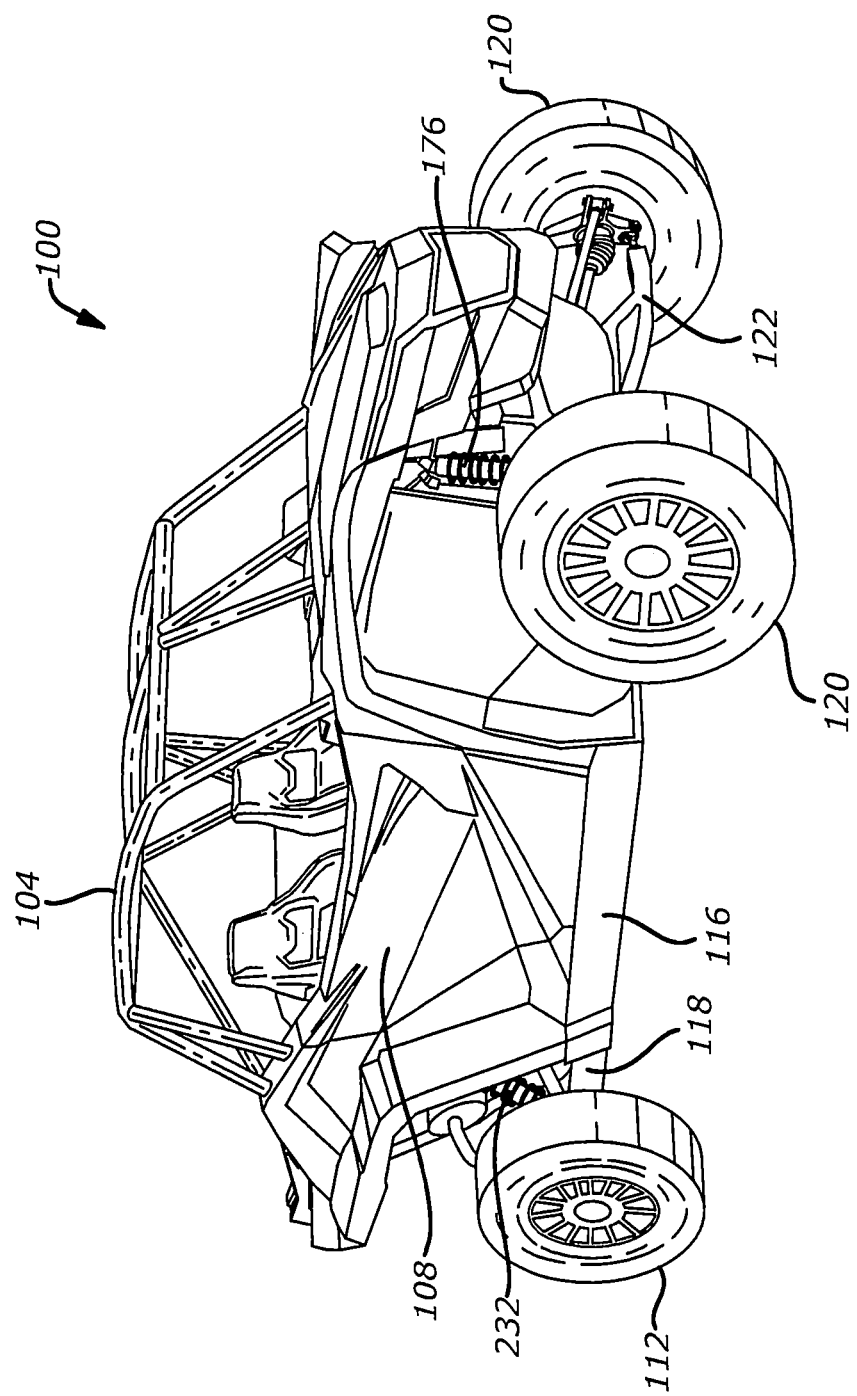
FIG. 1 illustrates an exemplary embodiment of an off-road vehicle that is suitable for implementation of rear strut gussets in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first strut," may be made. However, the specific numeric reference should not be interpreted as a literal sequential order but rather interpreted that the "first strut" is different than a "second strut." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same time improving the performance of such vehicles. Embodiments disclosed herein provide an apparatus and methods for an off-road vehicle chassis comprising rear strut gusset plates configured to improve the strength of the chassis.

FIG. 1 shows an off-road vehicle 100 that is particularly suitable for implementation of rear strut gusset plates in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system 118. Front wheels 120 may be operably coupled with the chassis 116 by way of a front suspension system 122 and a spindle assembly. It should be understood, however, that the rear strut gusset plates disclosed herein are not to be limited to the specific off-road vehicle 100 shown in FIG. 1, but rather the rear strut gusset plates may be incorporated into a wide variety of vehicles, other than the off-road vehicle 100 of FIG. 1, without limitation.

Figure 2:
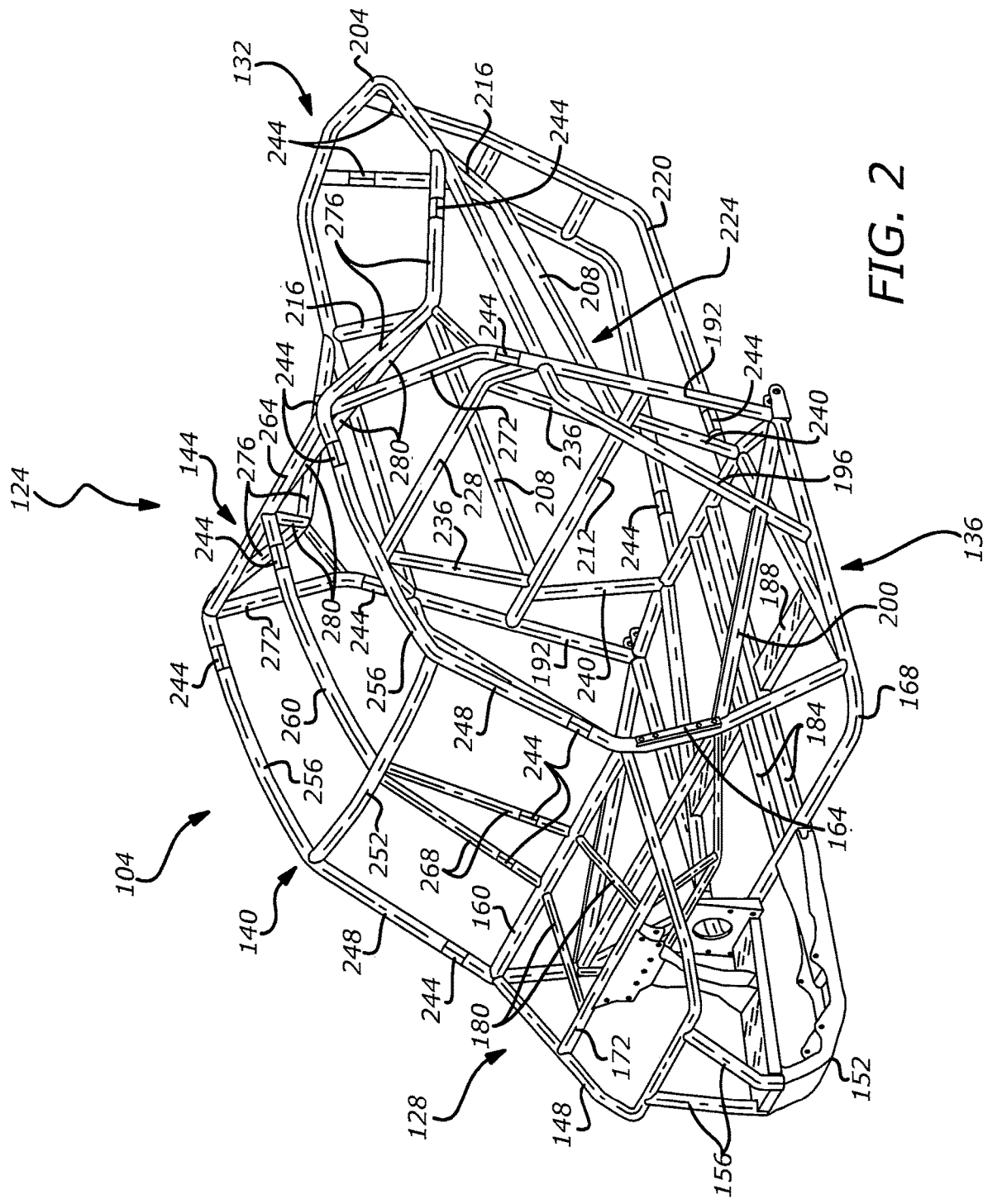
FIG. 2 illustrates an isometric view of an exemplary embodiment of vehicle chassis that is suitable for implementation of rear strut gusset plates according to the present disclosure.

FIG. 2 illustrates an isometric view of an exemplary embodiment of vehicle chassis 124 that is suitable for being reinforced with rear strut gusset plates and implemented in the off-road vehicle 100 of FIG. 1. The chassis 124 generally is a welded-tube variety of chassis that includes a front portion 128 and a rear portion 132 that are joined to an intervening passenger cabin portion 136. A front canopy 140 and a rear canopy 144 are configured to impart structural integrity to the chassis 124 and to provide overhead protection to occupants of the off-road vehicle 100, as described herein.

The front portion 140 generally is configured to support various components comprising the off-road vehicle 100, such as, by way of non-limiting example, a front suspension 122 (see FIG. 1), a steering gear, a front differential, and the like. The front portion 140 may be defined by a front hoop 148 at a top of the front portion 140 and a front skid plate 152 at a bottom of the front portion 140. Frontward stays 156 attach the front hoop 148 to the front skid plate 152. As will be appreciated, the frontward stays 156 operate similarly to a front bulkhead of the chassis 124. Opposite of the frontward stays 156, the front hoop 148 is joined to opposite ends of a dash bar 160 and hinge pillars 164 comprising the passenger cabin portion 136. Further, a rear of the front skid plate 152 is fastened to a floor hoop 168 comprising the passenger cabin portion 136.

With continuing reference to FIG. 2, a front strut crossmember 172 is attached at opposite ends between the driver-side and passenger-side of the front hoop 148. The front strut crossmember 172 provides a means for coupling front struts 176 to the chassis 124, see for example FIG. 1. As shown in FIG. 2, front strut braces 180 are disposed between the front strut crossmember 172 and the dash bar 160. The front strut braces 180 are configured to reinforce the front strut crossmember 172, such that loading on the front strut crossmember 172 by the front struts 176 is distributed to the dash bar 160. As such, forces on the front strut crossmember 172 by the front struts 176, during operation of the vehicle 100, are shared by the dash bar 160.

With continuing reference to FIG. 2, the floor hoop 168 generally defines a floor of the passenger cabin portion 136. Longitudinal floor bars 184 and crossmembers 188 coupled with the floor hoop 168 impart structural strength to the passenger cabin portion 136 and facilitate coupling various components to the floor of the passenger cabin portion 136. The hinge pillars 164 join the front portion 128 with the floor hoop 168 and thus define a front of the passenger cabin portion 136. Rear pillars 192 are coupled with a rear of the passenger cabin portion 136 and join the passenger cabin portion 136 with the rear portion 132 of the chassis 124. A rear side brace 196 is disposed between each rear pillar 192 and the floor hoop 168. Similarly, a front side brace 200 is disposed between the floor hoop 168 and each hinge pillar 164. It is contemplated that the side braces 196, 200 generally comprise side X-bars that impart structural integrity to the chassis 124 and thus resist bowing of the passenger cabin portion 136 due to loading on the front and rear portions 128, 132 during operation of the vehicle 100.

The rear portion 132 generally is configured to support a rear suspension 118 of the off-road vehicle, such as rear trailing arms, as well as support various drivetrain components, shown in FIG. 1, such as a transaxle, a rear differential, an engine, and the like. A rear hoop 204 is joined at opposite ends to rear pillars 192 and defines an upper extent of the rear portion 132. Below the rear hoop 204 are lower rear stays 208 that are coupled with the rear pillars 192 by way of a seat crossmember 212. Braces 216 couple the lower rear stays 208 to the rear hoop 204. The rear hoop 204, the lower rear stays 208 and the braces 216 comprise a structure suitable for mounting drivetrain components, such as a transaxle, a rear differential, an engine, and the like. A rear skid plate 220 is disposed at a bottom of the rear portion 132 and coupled between the passenger cabin portion 136 and a rear-most portion of the rear hoop 132. The rear skid plate 220 serves to provide protection to an underside of the drivetrain components during operation of the vehicle 100. As such, the rear hoop 204, the lower rear stays 208 and the rear skid plate 220 generally define an engine bay 224 of the vehicle 100.

Figure 3:
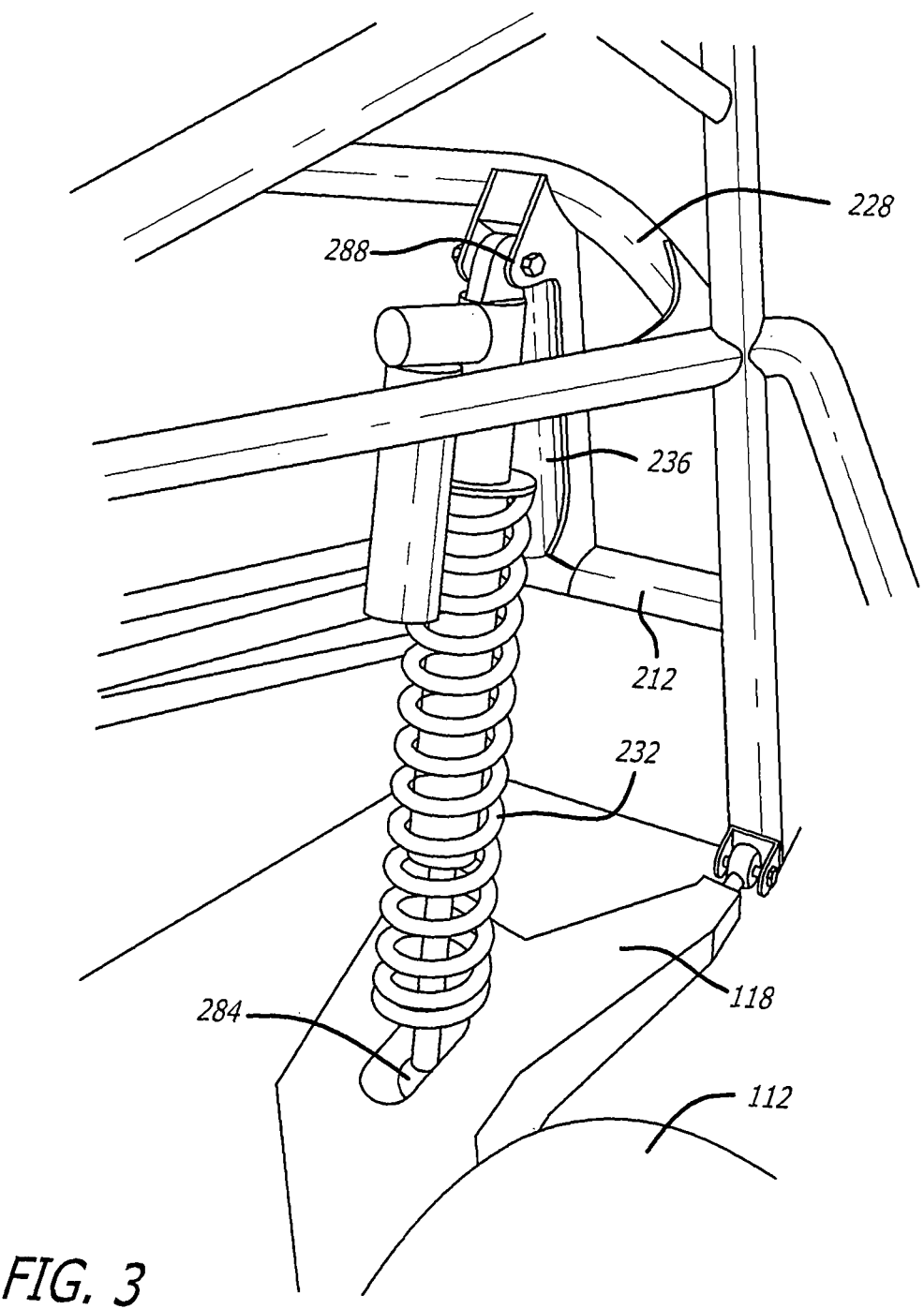
FIG. 3 illustrates an exemplary embodiment of a rear strut operably coupled between a rear strut crossmember comprising a chassis and a trailing arm suspension system that is coupled with a rear wheel of an off-road vehicle.

As shown in FIG. 2, a rear strut crossmember 228 is disposed between the rear pillars 192 and joined with the ends of the rear hoop 204. The rear strut crossmember 228 is configured to provide a means for coupling rear struts 232 to the chassis 124, as shown in FIG. 3. As shown in FIG. 2, vertical braces 236 are disposed between the rear strut crossmember 228 and the seat crossmember 212. The vertical braces 236 are configured to reinforce the rear strut crossmember 228, such that loading on the rear strut crossmember 228 by the rear struts 232 is distributed to the seat crossmember 212. As such, forces on the rear strut crossmember 228 by the rear struts 232, during operation of the vehicle 100, are shared by the seat crossmember 212. Further, lower braces 240 disposed between the seat crossmember 212 and the floor hoop 168 cause the passenger cabin portion 136 to contribute to distributing loading forces throughout the chassis 124.

FIG. 3 illustrates an exemplary embodiment of a rear strut 232 operably coupled between the rear strut crossmember 228 of the chassis 124 and a trailing arm suspension system 118 that is coupled with a rear wheel 112 of the off-road vehicle 100. The rear strut 232 is joined with the trailing arm suspension system 118 by way of a lower mount 284. The lower mount 284 may be of a bushing variety of joint that operates as a pivot during vertical articulation of the trailing arm due to the rear wheel 112 traveling over terrain. As further shown in FIG. 3, the rear strut 232 is fastened to the rear strut crossmember 228 by way of an upper mount 288 that receives a nut and bolt 280 (see FIGS. 4-5). The upper mount 288 is fixated to the rear strut crossmember 228 and thus provides a means for coupling the rear strut 232 to the chassis 124. Further, the upper mount 288 distributes loading of the rear strut 232 onto the rear strut crossmember 228 during articulation of the trailing arm suspension system 118 due to terrain.

As discussed herein, vertical braces 236 (see FIG. 2) are disposed between the rear strut crossmember 228 and the seat crossmember 212. The vertical braces 236 are configured to reinforce the rear strut crossmember 228 by distributing loading to the seat crossmember 212. As demonstrated by experimental observation, however, there are instances when the loading on the rear strut crossmember 228 may be great enough to break joints between the rear strut crossmember 228 and the vertical braces 236 and/or joints between the vertical braces 236 and the seat crossmember 212. As such, there is a desire to reinforce the vertical braces 236 to prevent breaking of the joints between the rear strut crossmember 228, the vertical braces 236, and the seat crossmember 212.

Figure 4:
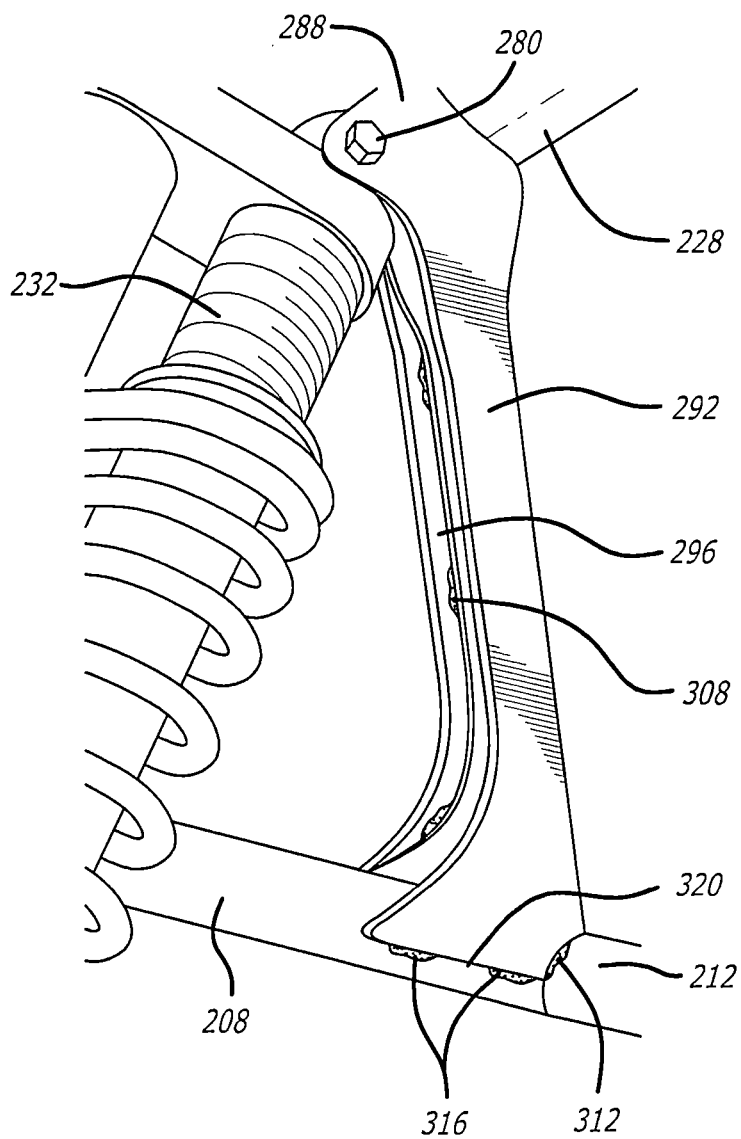
FIG. 4 illustrates an exemplary embodiment of rear strut gusset plates that are coupled with a vertical brace comprising a chassis to provide increased structural integrity to a rear strut crossmember, a vertical brace, and a seat crossmember comprising the chassis.
Figure 5:
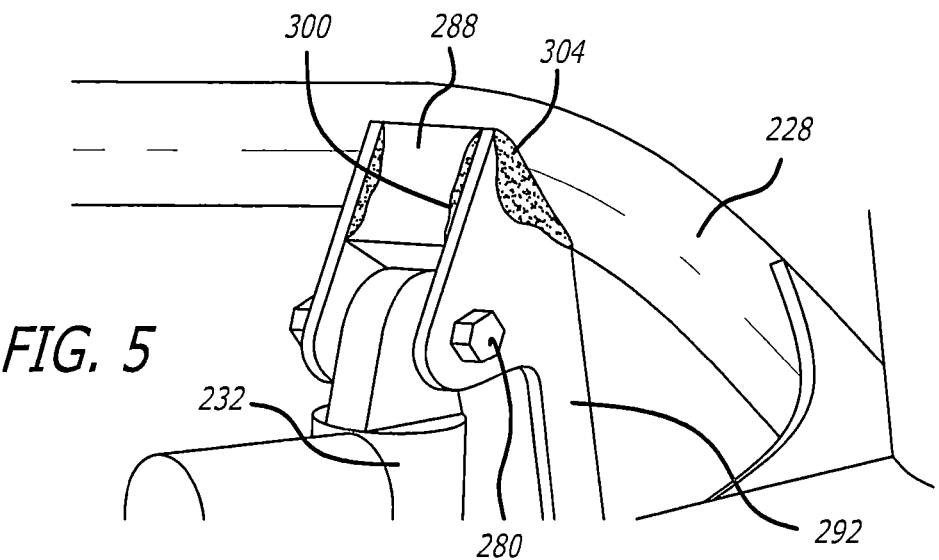
FIG. 5 illustrates an exemplary embodiment of rear strut gusset plates coupled with an upper mount that joins a rear strut to a rear strut crossmember comprising a chassis of an off-road vehicle.

FIG. 4 illustrates an exemplary embodiment of rear strut gusset plates that are coupled with a vertical brace 236 to provide increased structural integrity to the rear strut crossmember 228, the vertical brace 236, and the seat crossmember 212. In the illustrated embodiment of FIG. 4, a first rear strut gusset plate 292 and a second rear strut gusset plate 296 are attached to opposite sides of the vertical brace 236. The rear strut gusset plates 292, 296 generally comprise thick sheet-members that are attached to the vertical brace 236 between the upper mount 288 and the lower stay 208, thereby reinforcing the vertical brace 236 and imparting increased strength to the chassis 124. In some embodiments, however, the first and second gusset plates 292, 296 may comprise portions of a single component that is configured to fit over the vertical brace 236 and be fastened onto any one or more of the rear strut crossmember 228, the vertical braces 236, the seat crossmember 212 and the lower stay 208.

As will be appreciated, one or both of the rear strut gusset plates 292, 296 may be attached to any one or more of the upper mount 288, the rear strut crossmember 228, the vertical brace 236, the seat crossmember 212, and the lower stay 208 by way of bolts, rivets, welding, or any combination thereof. In the embodiment illustrated in FIG. 5, for example, each of the rear strut gusset plates 292, 296 is joined to the upper mount 288 by way of a bead weld 300. Similarly, the rear strut gusset plates 292, 296 are each joined to the rear strut crossmember 228 by way of a bead weld 304. As best shown in FIG. 4, the rear strut gusset plates 292, 296 may be attached to the vertical brace 236 by way of multiple bead welds 308 disposed along the length of the vertical brace 236. Further, each of the rear strut gusset plates 292, 296 may be joined to the seat crossmember 212 by way of a bead weld 312. Similarly, each of the plates 292, 296 may be joined to the lower stay 208 by way of bead welds 316. Preferably, a weep hole 320 is disposed between portions of the bead welds 316 to allow drainage of moisture buildup between the rear strut gusset plates 292, 296 and the lower stay 208.

Turning again to FIG. 2, the passenger cabin portion 136, as well as the front portion 128 and the rear portion 132, are configured to distribute loading forces during operation of the vehicle 100 so as to resist damage to components comprising the vehicle and to protect occupants riding within the vehicle 100. To this end, the canopy 104 is configured to contribute to the structural integrity of the chassis 124. The canopy 104 comprises a front canopy 140 and rear canopy 144 that are configured to be coupled with the chassis 124. In particular, the front canopy 140 is configured to be coupled with the front portion 128, and the rear canopy 144 is configured to be coupled with the rear portion 132.

Moreover, the front canopy 140 is configured to be coupled with the rear canopy 144. The front and rear canopies 140, 144 are respectively fastened to the front and rear portions 128, 132 by way of multiple fasteners 244. In general, each fasteners 244 comprises a tube-shaped member having a diameter that is substantially similar to the diameter of the frame portions to be coupled together.

It should be recognized that the front canopy 140 and the rear canopy 144 provide an overhead assembly that contributes to the overall integrity of the entire chassis 124. As such, the front canopy 140 and the rear canopy 144 provide an overhead spine to the chassis 124 that greatly increases the strength of the chassis 124 and thus the safety of occupants of the vehicle 100 relative to conventional chassis configurations. The front and rear canopies 140, 144 are discussed in greater detail in the following paragraphs.

The front canopy 140 includes an A-pillar 248 that is coupled with each hinge pillar 164 by way of a suitably sized fastener 244. The A-pillars 248 extend upward to a windshield crossmember 252. As such, the A-pillars 248 and the windshield crossmember 252 generally define a windshield area of the vehicle 100. Each A-pillar 248 joins with a roof bar 256 that extends rearward to the rear canopy 144. In some embodiments, the A-pillar 248 and the roof bar 256 comprise separate tube-pieces that are fastened or joined together, such as by welding. In some embodiments, however, the A-pillar 248 and the roof bar 256 comprise a single tube-piece that is suitably bent or manipulated to form the A-pillar 248 and the roof bar 256 as shown in FIG. 2. The roof bars 256 are each fastened to the rear canopy 144 by way of a suitably sized fastener 244.

With continuing reference to the front canopy 140 of FIG. 2, a center roof bar 260 is disposed substantially midway between the roof bars 256 and extends from the windshield crossmember 252 rearward to a roof crossmember 264 that comprises the rear canopy 144. Forward of the center roof bar 260, windshield braces 268 extend toward the dash bar 160. Each windshield brace 268 is joined with the dash bar 160 by way of a suitably sized fastener 244. Further, the windshield braces 268 are joined to locations of the dash bar 160 that coincide with the front strut braces 180. It is contemplated that loading forces due to the front struts 176, shown in FIG. 1, are distributed along the front strut braces 180, the windshield braces 268, and the center roof bar 260 to the rear canopy 144. It should be understood, therefore, that the front strut braces 180, the windshield braces 268, the center roof bar 260 and the rear canopy 144 comprise an overhead spine that serves to reinforce the structural integrity of the chassis 124.

As shown in FIG. 2, the center roof bar 260 and both roof bars 256 are each fastened to the roof crossmember 264 by way of suitably sized fasteners 244. The roof crossmember 264 is disposed between B-pillars 272 that are fastened to the rear pillars 192 comprising the passenger cabin portion 136 by way of fasteners 244. A rear brace 276 extends rearward of each B-pillar 272 from the roof crossmember 264 to the rear hoop 204. A suitably sized fastener 244 couples each rear brace 276 to the rear hoop 204. As such, the roof bars 256 are reinforced by the passenger cabin portion 136 by way of the rear pillars 192 and the B-pillars 272, as well as the rear portion 132 by way of the rear braces 276. Further, the center roof bar 260 is reinforced by roof braces 280 extending from the roof crossmember 264 to the rear braces 276. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A chassis strut support for a chassis of an off-road vehicle, the chassis strut support comprising:
   a first pair of rear strut gusset plates disposed on opposite sides of a first vertical brace for distributing loading on a rear strut crossmember by a first rear strut to at least a seat crossmember; and
   a second pair of rear strut gusset plates disposed on opposite sides of a second vertical brace for distributing loading on the rear strut crossmember by a second rear strut to at least the seat crossmember.

2. The chassis strut support of claim 1, wherein the first rear strut and the second rear strut are operably coupled between the rear strut crossmember of the chassis and a trailing arm suspension system that is coupled with rear wheels of the off-road vehicle.

3. The chassis strut support of claim 2, wherein the rear strut is joined with the trailing arm suspension system by way of a lower mount.

4. The chassis strut support of claim 2, wherein the rear strut is fastened to the rear strut crossmember by way of an upper mount that is fixated to the rear strut crossmember and thus provides a means for coupling the rear strut to the chassis.

5. The chassis strut support of claim 4, wherein the upper mount distributes loading of the rear strut onto the rear strut crossmember during articulation of the trailing arm suspension system due to terrain.

6. The chassis strut support of claim 1, wherein each of the first vertical brace and the second vertical brace is disposed between the rear strut crossmember and the seat crossmember are is configured to distribute loading on the rear strut crossmember to the seat crossmember.

7. The chassis strut support of claim 6, wherein each of the first pair of rear strut gusset plates and the second pair of rear strut gusset plates is configured to be coupled with a vertical brace to provide increased structural integrity to the rear strut crossmember, the vertical brace, and the seat crossmember.

8. The chassis strut support of claim 1, wherein each of the first pair of rear strut gusset plates and the second pair of rear strut gusset plates comprises thick sheet-members that are configured to be attached to the vertical brace between an upper mount and a lower stay comprising the chassis.

9. The chassis strut support of claim 8, wherein the first pair of rear strut gusset plates and the second pair of rear strut gusset plates are configured to reinforce the vertical brace and impart increased strength to the chassis.

10. The chassis strut support of claim 8, wherein one or more of the first pair of rear strut gusset plates and the second pair of rear strut gusset plates are configured to be attached to any one or more of the upper mount, the rear strut crossmember, the vertical brace, the seat crossmember, and the lower stay by way of bolts, rivets, welding, or any combination thereof.

11. The chassis strut support of claim 1, wherein one or more of the first pair of rear strut gusset plates and the second pair of rear strut gusset plates comprise portions of a single component that is configured to fit over the vertical brace.

12. The chassis strut support of claim 11, wherein the single component is configured to be fastened onto any one or more of the rear strut crossmember, the vertical brace, the seat crossmember, and a lower stay.

13. A method for a chassis strut support for a chassis of an off-road vehicle, comprising:
   attaching a first pair of rear strut gusset plates on opposite sides of a first vertical brace for distributing loading on a rear strut crossmember by a first rear strut to at least a seat crossmember; and
   attaching a second pair of rear strut gusset plates on opposite sides of a second vertical brace for distributing loading on the rear strut crossmember by a second rear strut to at least the seat crossmember.

14. The method of claim 13, wherein attaching includes configuring the first vertical brace and the second vertical brace to distribute loading on the rear strut crossmember to at least the seat crossmember.

15. The method of claim 13, wherein attaching includes configuring thick sheet-members to be attached to the vertical brace between an upper mount and a lower stay comprising the chassis.

16. The method of claim 15, wherein configuring includes configured the thick sheet-members to be attached to any one or more of the upper mount, the rear strut crossmember, the vertical brace, the seat crossmember, and the lower stay by way of bolts, rivets, welding, or any combination thereof.

17. A method of reinforcing a chassis strut support of a chassis of an off-road vehicle, comprising:
   aligning a first rear strut gusset plate along a first side of a vertical brace of the chassis;
   aligning a second rear strut gusset plate along a second side of the vertical brace;
   fastening the first rear strut gusset plate to the first side; and
   fastening the second rear strut gusset plate to the second side.

18. The method of claim 17, wherein fastening the first rear strut gusset plate includes fixating the first rear strut gusset plate to any one or more of an upper mount, a rear strut crossmember, the vertical brace, a seat crossmember, and a lower stay by way of bolts, rivets, welding, or any combination thereof.

19. The method of claim 17, wherein fastening the second rear strut gusset plate includes using any of bolts, rivets, welding, or any combination thereof, to fixate the second rear strut gusset plate to any one or more of an upper mount, a rear strut crossmember, the vertical brace, a seat crossmember, and a lower stay comprising the chassis.

* * * * *